US006514554B1

(12) United States Patent
Minelli et al.

(10) Patent No.: US 6,514,554 B1
(45) Date of Patent: *Feb. 4, 2003

(54) PROCESS FOR PREPARING FROZEN POTATO OR ROOT VEGETABLE STRIPS

(75) Inventors: Michael P. Minelli, Richland, WA (US); David L. Harney, Kennewick, WA (US)

(73) Assignee: Lamb-Weston, Inc., Kennewick, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/856,877

(22) PCT Filed: Nov. 19, 1999

(86) PCT No.: PCT/US99/27470

§ 371 (c)(1),
(2), (4) Date: Aug. 20, 2001

(87) PCT Pub. No.: WO00/30472

PCT Pub. Date: Jun. 2, 2000

Related U.S. Application Data

(63) Continuation-in-part of application No. 09/198,828, filed on Nov. 24, 1998, now Pat. No. 6,136,358.

(51) Int. Cl.[7] .............................................. A23L 1/217
(52) U.S. Cl. ...................... 426/438; 426/441; 426/637
(58) Field of Search ................................ 426/438, 441, 426/637

(56) References Cited

U.S. PATENT DOCUMENTS

| 2,778,736 A | 1/1957 | Wagner | |
| 3,194,662 A | 7/1965 | Nelson | |
| 3,335,015 A | 8/1967 | Forkner | |
| 3,457,087 A | 7/1969 | Renner | |
| 3,635,722 A | 1/1972 | Moore | |
| 3,973,481 A | 8/1976 | Mies | 99/408 |
| 4,020,188 A | 4/1977 | Forkner | 426/95 |
| 4,059,046 A | 11/1977 | Yamazaki et al. | 99/355 |
| 4,283,437 A | 8/1981 | Fan et al. | 426/637 |
| 4,585,660 A | 4/1986 | Sugisawa et al. | 426/438 |
| 4,590,080 A | 5/1986 | Pinegar | 426/441 |
| 4,632,838 A | 12/1986 | Doenges | 426/441 |
| 4,653,391 A | 3/1987 | Shimizu | 99/349 |
| 4,732,081 A | 3/1988 | Sakuma | 99/407 |
| 4,769,249 A | 9/1988 | Webb | 426/438 |
| 4,786,516 A | 11/1988 | Sugisawa et al. | 426/385 |
| 4,828,859 A | 5/1989 | Imai | 426/302 |
| 4,852,475 A | 8/1989 | Yang | 99/404 |
| 4,857,347 A | 8/1989 | Webb | 426/438 |
| 4,873,920 A | 10/1989 | Yang | 99/409 |
| 4,900,576 A | 2/1990 | Bonnett et al. | 426/438 |
| 4,985,266 A | 1/1991 | Sakuma | 426/438 |
| 5,168,797 A | 12/1992 | Wang | 99/342 |
| 5,179,891 A | 1/1993 | Chiu | 99/407 |
| 5,185,168 A | 2/1993 | Takahashi | 426/233 |
| 5,263,406 A | 11/1993 | Chiu | 99/407 |
| 5,275,093 A | 1/1994 | Chiu | 99/408 |
| 5,301,604 A | 4/1994 | Takahashi | 99/407 |
| 5,490,453 A | 2/1996 | Mackay | 99/495 |
| 5,611,265 A | 3/1997 | Ronci et al. | 99/353 |
| 5,676,042 A | 10/1997 | Sakuma et al. | 99/330 |
| 5,753,291 A | 5/1998 | Pederson et al. | 426/441 |
| 6,136,358 A | * 10/2000 | Minelli et al. | 426/441 |

FOREIGN PATENT DOCUMENTS

| AU | 286072 | 6/1964 |
| GB | 1284111 | 8/1972 |
| GB | 2188528 | 10/1987 |
| JP | 58-36350 | 3/1983 |
| JP | 58-183048 | 10/1983 |
| JP | 0146547 | 8/1984 |
| JP | 0187749 | 10/1984 |
| JP | 59-210853 | 10/1984 |
| JP | 59-210854 | 11/1984 |
| JP | 59-210855 | 11/1984 |
| JP | 60-262558 | 12/1985 |
| JP | 2195244 | 2/1987 |
| JP | 62-122562 | 6/1987 |
| JP | 62-195244 | 8/1987 |
| JP | 62-278970 | 12/1987 |
| JP | 3263063 | 10/1988 |
| JP | 01-128766 | 5/1989 |
| JP | 02-200222 | 8/1990 |
| JP | 2-265455 | 10/1990 |
| JP | 403210165 | 9/1991 |
| JP | 03-292851 | 12/1991 |
| JP | 04-158760 | 6/1992 |
| JP | 04-307017 | 10/1992 |
| JP | 51-37331 | 6/1993 |
| SU | 316427 | 5/1961 |
| WO | WO-9512989 A1 | 5/1995 |

OTHER PUBLICATIONS

"Vacuum Frying Technology!", Apple and Snack Company (7pp) (Mar. 1999 website).
"Potato Buisness World" excerpt, front cover and inside front cover (2pp) (May/Jun. 1997).

* cited by examiner

*Primary Examiner*—Arthur L. Corbin
(74) *Attorney, Agent, or Firm*—Klarquist Sparkman, LLP

(57) ABSTRACT

An process for preparing frozen potato strips or root vegetable strips includes blanching the strips, parfrying the strips in oil in a vacuum and then freezing the strips. In another embodiments, the strips are blanched, fried in oil at atmospheric pressure, cooled in air, parfried in oil in vacuum and then frozen.

27 Claims, No Drawings

PROCESS FOR PREPARING FROZEN POTATO OR ROOT VEGETABLE STRIPS

This a application is a national stage of international application No. PCT/US99/27470, filed Nov. 19, 1999, which is a continuation-in-part of U.S. application Ser. No. 09/198,828, filed Nov. 24, 1998, now U.S. Pat. No. 6,136, 358.

BACKGROUND OF THE INVENTION

This invention relates to food processing and, more particularly, to a process for preparing frozen potato products and the like.

Commercially prepared frozen potatoes (or so-called french fries) typically are prepared by slicing whole potatoes into strips, blanching the strips in hot water or steam, drying the strips in hot air, parfrying the strips in oil, and then freezing the strips. The frozen potato strips are reconstituted by frying them in oil and draining off the oil. Other reconstitution methods include oven heating and microwave heating. Many prior processes use variations of the foregoing process, including additional steps, to prepare frozen potato products.

The vast majority of these processes include a parfrying step. During this step, the potato strips typically are immersed in a tank of hot cooking oil or fat. Alternative frying methods may be used such as "deluge frying," wherein hot frying oil is sprayed downwardly or caused to deluge downwardly onto the potato strips as they move thereunder on a conveyor. The frying oil, which typically has a temperature of 350 to 375° F., heats the potato strips, driving moisture out of the strips and thereby increasing the strips' so-called "solids content." The parfrying step is a relatively abusive way to quickly and aggressively drive moisture out of the strips, especially at higher frying temperatures.

In an effort to reduce the duration of the parfrying step and keep the frying temperature no higher than the typical range of 350 to 375° F., many commercial processors include a hot air drying step to facilitate moisture removal and achieve a target solids content for the frozen product. Commercially prepared frozen processed potatoes, destined to be reconstituted by finish frying, typically have a solids content of 30 to 50% and, when finish fried, a solids content of 40 to 60%. This target can vary depending on whether the product is intended to be a "low solids" product, "medium solids" product or "high solids" product, each of which fills a different market niche. By way of further example, the target also can vary within an even higher range depending on whether the product is intended to be a "quick refry" product or product intended for oven or microwave reconstitution.

While the traditional high temperature water (or steam) blanching step, parfrying step and hot-air drying step facilitate moisture removal and other processing goals, they may contribute to one or more of the following consequences. For one, extensive blanching and air-drying tends to cause dust-like potato particles to slough-off during finish frying. The frying oil tends to chemically break down and cloud up, shortening the life of the frying oil. Second, flavorings, seasonings and spices tend to volatilize or vaporize in relatively high heat and therefore are not retained in the final product. Third, high temperature frying can cause the strips to darken due to the Maillard reaction which involves reducing sugars and amino acids. To combat this effect, it becomes preferable or necessary to start with high quality raw potatoes having fewer reducing sugars. This need becomes even more compelling for frozen potato products designed to have a high solids content. Fourth, some potato flavor is lost as flavor components are degraded and/or volatilized in frying oil heated to a high temperature. This problem is even more acute with "high solids" potato products which require longer, more extensive processing. Finally, the traditional high temperature frying method uses hydrogenated oils which tend to have higher levels of transfatty acids. Likewise, saturated animal fats, high in cholesterol, are commonly used with this method.

Many of the foregoing consequences are exacerbated in conventional processes designed to produce "quick refry" and oven prepared products having a relatively high frozen solids content. "Quick refry" (80 to 90 second reconstitution) products are highly desired by fast-food restaurant operators because they allow the operator to respond to customer demand for just-cooked french fries. Ideally, fast-food operators prefer a frozen potato product which can be prepared quickly on the basis of actual customer demand rather than anticipated demand. The production of "quick refry" and oven prepared potato products requires more extensive processing, typically requiring trade offs in product quality such as flavor and appearance.

Accordingly, there remains a need in the commercial frozen potato product industry for a process for preparing frozen potato products which offers one or more of the following advantages, especially in product applications involving quick refry and oven prepared products: less particulate dust in the frying oil; increased oil life; greater flavor retention; reduced color darkening; brighter frozen appearance; increased potato flavor; more frying oil options; ability to fortify; and reduced reliance on holding stations, thereby providing a fresher, hotter and potentially more nutritious product for the customer.

SUMMARY OF THE INVENTION

In brief summary, the present invention comprises an improved process for preparing frozen potato strips and the like. In one embodiment, the strips are blanched, preferably passed through an air blower to remove surface moisture, fried in oil in a vacuum, and then frozen. In another embodiment, the strips are blanched, preferably passed through an air blower to remove surface moisture, fried in oil under atmospheric pressure, cooled in air, parfried in oil under a vacuum and then frozen. The frying oil preferably has a temperature of about 240 to 290° F., but in some product applications higher frying temperatures may be desirable. In yet another embodiment, the strips are blanched, air dried, parfried in oil and frozen in a conventional manner, and thereafter stored, parfried in oil under a vacuum and again frozen.

The foregoing process produces a high quality frozen potato product having a brighter, less dull color and enhanced potato flavor. It also can be used to produce an exceptional "quick refry" finished product which can be reconstituted in a short period of time, as well as an excellent oven prepared product. Other processing and product advantages also are achieved.

DETAILED DESCRIPTION OF A PREFERRED EMBODIMENT

In accordance with one embodiment of the present invention, raw potatoes, such as the Russet Burbank, Ranger or Shepody varieties, are cleaned, trimmed and inspected for defects. The potatoes are cleaned using a water plume or spray. The potatoes then are cut into sections or pieces suitably sized for french fried potato strips. As used herein, the term "strips" is used in its broadest sense to include strips having a rectangular cross section (such as ¼×¼ inch shoestring cut, 11/32×7/16 inch cut, 5/16 inch square cut, 3/8 inch square cut, 5/16×3/18 inch cut), as well as other specialized cuts (such as so-called "crinkle" cuts, "helical" cuts, "waffle" or "lattice" cuts and the like). As used herein, percentages are determined "by weight" unless otherwise indicated.

The cut potato strips are blanched by immersing them in hot water, typically at about 160 to 180° for about 4 to 9 minutes, and most preferably at about 170 to 180° F. for about 5½ to 6½ minutes. It will be appreciated that the water temperature and immersion time may vary (even outside the noted ranges), depending, among other variables, upon the cut configuration and size of the potato strips. Generally, the purpose of the blanching step is to leach sugars when necessary, and gelatinize the potato starch (which generally can be determined by breaking the strips and observing the presence of liquefied starchy strands stretching out between the broken ends as they separate). The blanching step also serves to reduce the leaching of natural flavor components present in the strips. The blanching step further deactivates enzymes present in the raw potato.

Alternatively, the strips may be blanched in steam or in a deluge blancher.

Next, a solution of dextrose and sodium acid pyrophosphate (SAPP) is applied by spraying or immersing the blanched strips in a flume containing the SAPP and dextrose. The SAPP preferably is applied as a spray having a concentration of about 0.5 to 2.0%, and most preferably about 0.7 to 1.2%. The dextrose preferably is applied as a spray having a concentration of about 0.5 to 1.0%. The desired concentration of SAPP and dextrose is influenced by the desired color shade of the reconstituted potato product. For example, as the concentration of dextrose increases, the final color shade becomes darker. Following the SAPP/dextrose spray, the strips are allowed to drain for a few minutes. A high velocity fan nozzle may be used to blow off excess surface moisture which otherwise would tend to break down the parfrying oil through hydrolysis.

The strips then are partially fried in hot oil in a vacuum. The strips preferably are fried in oil having a temperature of about 240 to 290° F. for about 1 to 5 minutes, and most preferably at 240 to 260° F. for about 2 to 4 minutes. The vacuum preferably is maintained at about 10 to 20 inches of mercury, and most preferably at about 15 inches of mercury. The vacuum fryer provides a closed, sealed environment from which air and other vapors are being evacuated continuously.

It will be appreciated that the actual vacuum frying parameters are influenced by the type of product being processed and target specifications for the final product. For example, the optimal oil temperature and frying time are influenced by the vacuum level. Generally speaking, frying temperatures below 240° F. will suffice, but moisture removal tends to be slower, requiring the product to be retained longer in the vacuum fryer and/or subjected to higher vacuum levels. This tends to increase processing costs and requires larger processing equipment. Above 290° F., the benefits of vacuum frying, including improved moisture removal efficiency and better flavor retention, do not appear to differ significantly from atmospheric frying at the same temperature. Thus, for many product applications a frying temperature of about 240 to 290° F. is preferred.

At vacuum levels below 10 inches of mercury, the moisture removal rate continues to decrease as the boiling point of water increases, causing the vacuum frying treatment to behave more like a traditional frying treatment at atmospheric pressure. At vacuum levels above 20 inches of vacuum, the cost of creating and maintaining the vacuum increases significantly. Thus, for most product applications a vacuum of 10 to 20 inches is preferred.

The partially fried strips are next frozen and packaged in a conventional manner for storage and/or shipment. The frozen product typically will have a solids content of about 34 to 50%, including about 10 to 17% oils, depending upon the particular cut of the strips and process parameters selected.

One application of the foregoing single-fry process is a frozen potato product having a mid-range solids content of about 34–38% which can be reconstituted by finish frying in oil in about 3 minutes. This type of product often is served in fast-food restaurants accustomed to traditional finish frying times of about 3 minutes. This single-fry process is best-suited for producing frozen parfried products having a solids content less than about 38%.

It will be appreciated, however, that the foregoing single-fry process can be modified in various ways. For example, the process can be modified to have two or more freezing or air cool, vacuum fry cycles (or a combination of vacuum fry, atmospheric fry cycles). It has been found that moisture removal which occurs during vacuum frying is proportional to retention time but begins to decline significantly after a certain period of time (typically after about 3 minutes for a 5/16 cut product). It is believed that this occurs because water removed most readily near the surface of the strips is partially replaced by frying oil which inhibits residual water in lower potato tissues from reaching the surface. Intermediate resting stages between frying cycles allow internal water to migrate back to the surface for removal during a subsequent vacuum frying cycle.

In an alternative embodiment, raw potatoes are cleaned, trimmed, inspected, cut, blanched, sprayed with a dextrose/SAPP spray, and air blown as described above. The strips are then parfried a first time under atmospheric pressure in frying oil having a temperature of about 350 to 380° F. for about 20 to 100 seconds, and most preferably at about 360 to 375° F. for about 50 to 70 seconds. This step can be accomplished using a conventional immersion fryer, deluge fryer or other conventional fryer. The parfried strips are then cooled in air. The cooling step preferably is a two-stage sequence in which the strips are first cooled at a temperature of about 0 to 15° F. for about 2 to 6 minutes, and then cooled at a temperature of about 30 to 40° F. for about 15 to 30 minutes, preferably 18 to 24 minutes. At prolonged cooling temperatures above 50° F., the final product tends to develop a tougher surface (which may be acceptable for some product applications). At prolonged temperatures below 30° F., some freezing may occur which tends to produce an irregular texture in the finished product.

Ideally, the internal strip temperature is lowered to about 30 to 45° F. within the first 2 to 6 minutes or so and then maintained at about 30 to 40° F. for about 15 to 30 minutes. Most preferably, the strip temperature is lowered to about 30 to 40° F. within the first 3 minutes and then maintained in that temperature range for about 18 to 24 minutes. The short initial cooling stage serves primarily to quickly decrease the internal temperature of the strips to the preferred temperature range or at least close to the preferred range. The second longer cooling stage serves primarily to equilibrate the moisture in the strips. The two-stage cooling sequence preferably is carried out in a single cooling tunnel having one or more cooling modules at the entry end which create a colder environment than downstream modules.

The cooled strips then are fried a second time, this time in a vacuum, and frozen in the manner described above. Optimally, the strips are vacuum fried in frying oil at a temperature of about 240 to 290° F., preferably about 240 to 260° F., for about 1 to 6 minutes. Again, the vacuum is maintained at about 10 to 20, preferably about 15, inches of mercury.

The resulting frozen product has a solids content of about 36 to 50%, including about 10 to 20% oils. The actual solids content can vary markedly depending upon the type of potato cut processed, process parameters selected, and desired product specifications.

For example, this double-fry process can be used to make a quick refry product which, when finish fried, has a relatively tender, thin, crisp outer surface, edges and ends compared to conventional potato products, particularly those prepared from a process having an air drying step. The product also exhibits a moist interior, more natural potato flavor, brighter appearance and more uniform coloring in comparison to conventional quick refry potato products. Quick refry products generally have a boosted solids content (when frozen) in the 39 to 50% range and are finish fried in hot oil at about 360° F. for about 80 to 90 seconds.

It will be appreciated, however, that the double-fry process also is well-suited for producing other products having a solids content (when frozen) up to about 50%, including traditional fast-food restaurant products (34 to 38% solids with finish fry time of about 3 minutes), and quick refry products (39 to 50% solids). The double-fry process also can be used to make potato products, such as oven-prepared products, having even higher solids contents (above 50%), although for such product applications it may be preferable to increase the frying temperature (up to about 365° F.), trading off some of the benefits of low temperature frying.

The foregoing fry-cool-vacuum fry process is better suited for producing potato products having a relatively high solids content than the single vacuum fry process. The fry-cool-vacuum fry process also offers greater flexibility in achieving certain target product characteristics. The atmospheric and vacuum frying conditions can be modified to more subtly influence product characteristics. For example, increasing the duration of the atmospheric frying step tends to produce a product with a thicker, more durable surface crust. Also, the product's finish frying time can be shortened, within reason, by increasing the duration of the atmospheric parfrying step, vacuum parfrying step, or both, with different product effects, depending on the option chosen. Stated another way, the use of two distinctly different frying steps makes it easier for the processor to control and fine tune product characteristics. For example, a product having a solids content of 70%, when frozen, is theoretically achievable with multiple vacuum-fry-cool-vacuum-fry cycles. As the target solids content increases above 50%, for some product applications three or more fry-cool cycles may be preferable to achieve the desired product characteristics.

The vacuum frying step provides a method of removing moisture from the potato strips without exposing them to hot-air drying. Hot-air drying tends to create tough, desiccated outer surfaces and edges which have unappealing eating characteristics. Such pieces are sometimes described as hard, tough, chewy, dry or crunchy. It is believed this condition occurs because air is not an efficient means of transferring heat to the product to initiate the evaporation process. Therefore, the air temperature must be hotter than the potato strip to achieve a predetermined moisture loss relatively quickly or, alternatively, the hot air exposure time must be prolonged at lower air temperatures. With hot air drying, the edges and ends of the strips are more likely to absorb heat due to their relatively large surface area. This causes preferential drying at these points.

When a liquid such as frying oil is used to transfer heat energy, the energy transfer is more efficient and more uniform. Under vacuum conditions, the moisture evaporates at a lower temperature, resulting in less tissue damage (as indicated by surface desiccation) and crust formation. The resulting product generally has a softer, more tender surface crust (shell), edges and ends than a product subjected to hot air drying.

Flavor components of potato strips frequently are degraded during each heating phase of the process. This is due to evaporation of those components which are volatile and thermal decomposition of those which are heat-labile. The present low temperature, vacuum frying process preserves these flavor components for several different product applications because it maximizes water removal at very low temperatures and does not require an air drying step.

In addition, the present process facilitates the use of flavorful oils and flavor-enhanced oils for many product applications. Generally, oil flavors of some oils will volatilize at conventional frying temperatures. The lower temperature used in these vacuum frying applications allows such oils to be used with minimal loss of flavor components. It is recognized that if a customer refries the resulting product for a standard time and at a standard temperature, the flavorful parfry oil will be partially lost in this step. However, the present process allows the production of high-quality, quick-refry products, thereby preserving the flavor of the parfry oil even at the point of consumption. Oil consumption at restaurants is substantially reduced because the product picks up less oil and is finish fried for a shorter time.

Because many products prepared in accordance with the present invention are fried at a lower temperature and preferably are not air dried, they tend to slough off less potato particulates and dust, particularly in comparison to conventional quick refry products (the surfaces of which are worked hard during relatively long, extensive processing). As a result, the vacuum frying oil tends to be lighter in color and clearer and has a longer life. In addition, the frying oil does not break down as rapidly as it would at higher frying temperatures.

The color darkening problem which tends to occur at higher frying temperatures and double-fry processes is reduced by the present invention in many product applications. The quality of the starting raw potato material therefore becomes less critical, even with frozen potato products targeted to have a high solids content.

The present process also makes it easier to use healthier, partially saturated and monosaturated frying oils (such as olive oil, sunflower oil and sesame oil) which are naturally lower in transfatty acids and which tend to form undesirable free-fatty acids in traditional, high temperature processes.

Furthermore, the use of a lower temperature during the vacuum parfry step makes the french fries of the present invention a food appropriate for fortification with vitamins or other fortificants, even if such additives are adversely affected by heat. For example, the present invention can be used to add fortificants including but not limited to, vitamin D, vitamin E, vitamin C, the B-complex vitamins, including folic acid, iron, and iodine. Fortification ideally occurs at the latest step in the processing of the french fries that is practicable, as the final freezing step generally does not alter many fortificants. However, the lower fry temperatures used in the vacuum parfry step of the present invention does allow a greater effective portion of even heat-degradable fortificants to remain in the product upon consumption, if the fortificant/vitamin is added to the food prior to this step.

In summary, many advantages are achieved by the present process because the potato strips are subjected to less destructive processing steps to achieve a desired solids content. Advantages also result from the preferred omission of the hot air drying step commonly used in many prior processes. This has the effect of shortening the production line and reducing manufacturing costs.

The present process also is quite versatile, giving the processor additional options. In addition to traditional fast-food restaurant potato products and quick refry products, the present process in its multiple-fry embodiment can be used to prepare high quality oven-reconstituted products having frozen solids of 50% and higher. Although with such high solids products, it is preferable to fry at higher temperatures (losing some of the benefits attributable to low temperature frying), other benefits such as product quality remain. With many product applications, the processor is afforded the option of using flavored oils and healthier oils in the parfrying step(s).

The vacuum frying step will now be described. It is highly preferable to create a sealed vacuum environment for the strips and frying oil before the strips are immersed in the frying oil and to maintain the vacuum while the strips are removed from the frying oil. In other words, the strips most preferably are introduced into and removed from the frying oil under vacuum conditions.

One way to accomplish this objective is to use a batch-type pressure vessel having conventional means to hold and heat the frying oil to the desired frying temperature and means for evacuating air/vapor from the sealed vessel. In operation, a batch of strips is placed on a perforated support in the vessel above the frying oil, the vessel is sealed, a vacuum is created in the sealed vessel, and then a mechanical or electro mechanical device is actuated to lower the perforated support and strips into the frying oil. At the end of the desired frying time, the device is manually or automatically actuated to raise the strips out of the frying oil, the vacuum is released to restore the vessel pressure to atmospheric pressure, and the vessel is opened.

A more preferred way to accomplish the vacuum frying step is to use a continuous system, similar to existing vacuum processing equipment, to vacuum fry the strips. A continuous system has the advantage of providing a continuous flow of strips to downstream processing equipment.

The general construction of one exemplary continuous vacuum fryer design suited to carrying out the vacuum frying step will now be described. It will be appreciated that alternative designs also may be used. By way of theoretical example, a continuous vacuum fryer may include a large high-pressure stainless steel conduit or pipe having at least two vacuum chambers which can be sealed from one another. The pipe is divided into a frying chamber and a discharge chamber, with a first sealing door or other means located at the interface between the chambers to selectively seal the frying chamber from the discharge chamber. The frying chamber includes a main conveyor such as a wire mesh chain. The main conveyor descends into an oil pan (containing frying oil) located in the frying chamber, and carries the strips to the other end of the oil pan where it ascends to a location near the opening of the discharge chamber. A draper chain with perforated flights is mounted above the oil pan. The draper chain serves to keep the floating strips immersed in the frying oil and to urge them toward the discharge end of the oil pan where they are picked up by the ascending main conveyor. The drive mechanism for the main conveyor and draper chain and heat exchange system for heating and filtering the frying oil are of conventional design. The vacuum system for creating and maintaining the vacuum in the frying chamber includes vacuum pumps and other well-known components.

The frying chamber is maintained under vacuum at all times during operation, and therefore the strips must be introduced into the frying chamber under vacuum. One way to do so is to use a star valve having a substantially cylindrical elongated stationary housing which substantially surrounds an elongated rotatable valve. The valve includes a number (twelve for example) of elongated chambers or pockets which are about 2 to 3 inches deep by 3 to 4 inches wide. The elongated pockets are spaced equidistant around the circumference of the valve. The pockets are separated by vanes which substantially seal one pocket from the next. Each vane has a UHMW or similar inset blade which wipes against the surrounding housing to create a moving seal. The housing has an elongate inlet opening located above the main conveyor and diametrically opposed elongate discharge opening, both of which are slightly wider than the width of a single pocket. The star valve also includes plural vacuum lines in fluid communication with the housing's interior.

In operation, strips are deposited continuously into each pocket as it rotates past the entry opening at the top of the star valve. As each strip-filled pocket rotates into sealed contact with the surrounding housing, air is withdrawn from the pocket through multiple vacuum lines to create a vacuum in the pocket. By the time the pocket reaches the discharge opening at the bottom of the star valve, the pocket and strips contained therein are at the same vacuum level as the frying chamber. The strips drop by gravity from the pocket through the discharge opening onto the main conveyor. The now empty pocket continues to rotate upwardly toward the inlet opening. As the pocket does so, the vacuum is released by air entering the pocket through multiple vacuum lines such that the pocket reaches atmospheric pressure by the time it aligns with the inlet opening.

At the discharge end of the oil pan, the main conveyor carries the strips out of the oil pan and deposits them onto a longitudinally movable discharge conveyor. The entire discharge conveyor moves longitudinally back and forth on tracks between the frying chamber and discharge chamber. At regular intervals, the discharge conveyor moves from the frying chamber into the discharge chamber, and the first sealing door between the two vacuum sealed chambers closes and seals. A pump then is actuated to equalize the pressure in the discharge chamber with atmospheric pressure, at which time a second sealing door at the discharge end of the discharge chamber opens to allow the discharge conveyor to move longitudinally on tracks to a position where the strips are deposited onto an outer conveyor located completely outside the vacuum fryer. Once all strips on the discharge conveyor are deposited on the outer conveyor, the discharge conveyor moves back into the discharge chamber and the second sealing door closes to seal the discharge chamber. A vacuum pump is actuated to return the discharge chamber to the same level of vacuum as the frying chamber, at which time the first sealing door opens to permit the discharge conveyor to move back into the frying chamber to receive the next load of partially fried strips from the main conveyor. Suitable actuating, timing and control mechanisms operate to smoothly convey the strips from the main conveyor, through the frying oil, onto the discharge conveyor and, finally, onto the outer conveyor in a manner which maintains the desired vacuum level in the frying chamber. In this way, the strips enter and exit the frying oil under vacuum.

EXAMPLE 1

This example illustrates one application of the present invention to "quick refry" frozen french fried potatoes which can be reconstituted within 80 to 90 seconds in a deep fryer. The general parameters in this example apply to any cut of potato.

Whole unpeeled Russet Burbank potatoes were washed and sliced into the desired raw cut (5/16 by 3/8 inch cross-section strips). The cut strips were then immersion blanched in hot water at 175 to 180° F. for 6 minutes. The strips were removed from the blanch water and sprayed with a water solution of 1.0% by weight Sodium Acid Pyrophosphate and 0.5% by weight Dextrose until all strip surfaces are covered by the solution.

The strips then were fried in hot oil at 360° F. for 80 seconds at atmospheric pressure. The parfried strips were cooled at 0° F. for 6 minutes to a product temperature of 32° F. The strips then were held in 40° F. ambient air for 18 minutes.

The strips were refried under vacuum in hot oil at 250° F. and 15 inches of Hg vacuum for 4 minutes. The vacuum frying chamber was held at 15 inches of Hg vacuum before the strips were introduced into the oil, while they were in the oil, and while they were removed from the oil. The strips then were removed from the vacuum frying chamber and frozen. The solids content of the frozen parfried product averaged 46.97 percent by weight. The oil content averaged 14.34 percent by weight.

The frozen strips were prepared by frying them in oil at 360° F. for 90 seconds. The strips had a light, crisp shell and moist interior with flavor typical of baked potatoes. The strips did not exhibit toughness upon cooling, yet remained crisp when held for 7 minutes under a heat lamp. The refried strips had an average solids content of 52.82 percent, including 15.84 percent oils.

EXAMPLE 2

This example illustrates the capability of the present invention to add desirable flavors (for example, butter flavor) which are retained and noticeable at the time of serving.

Whole unpeeled Russet Burbank potatoes were washed and sliced into the desired raw cut (0.312 by 0.312 inch cross-section strips). The cut strips were immersion blanched in hot water at 170° F. for 4 minutes. The blanched strips were removed from the blanch water and sprayed with a water solution of 1.0% by weight Sodium Acid Pyrophosphate and 0.5% by weight Dextrose until all strip surfaces were covered by the solution.

The treated strips were fried in hot oil at 360° F. for 70 seconds at atmospheric pressure. The strips then were cooled in refrigerated, circulated air at 0° F. for 6 minutes to a product temperature of 30° F. The strips then were held in refrigerated air at 40° F. for 18 minutes.

Heat-stable butter flavoring was added to the vacuum frying oil at a concentration of 0.10 percent by weight. The strips then were fried under vacuum (15 inches of mercury) in the butter-flavored hot oil at 250° F. for 2.5 minutes. The vacuum was maintained in the frying chamber while the strips were introduced into the oil, immersed in the oil, and removed from the oil. The strips then were removed from the frying chamber and frozen. The frozen strips had an average solids content of 49.84 percent by weight including 15.45 percent oils.

The frozen strips were prepared by frying in oil at 360° F. for 80 and 90 seconds. The strips fried for 80 seconds had a light, crisp shell and moister interior. Those fried for 90 seconds had a slightly crisper, more desirable shell. The strips did not exhibit toughness upon cooling, yet remained crisp when held for 7 minutes under a heat lamp. The strips had a recognizable butter flavor, without being excessive. The refried strips had an average solids content of 60.01 percent by weight, including 18.66 percent oils. Butter concentrations ranging from 0.07 to 0.25 percent were tested, with a concentration of 0.10% being generally preferred.

EXAMPLE 3

This example illustrates the capability of the invention to produce standard-reconstitution frozen french fried potatoes which retain natural baked-potato flavor.

Whole unpeeled Russet Burbank potatoes were washed and sliced into the desired raw cut (3/8 inch by 3/8 inch cross-section strips). The cut strips were immersion blanched in hot water between 160 and 170° F. for 8 minutes. The strips were removed from the blanch water and sprayed with a water solution of 1.0% by weight Sodium Acid Pyrophosphate and 0.5% by weight Dextrose until all strip surfaces were covered by the solution.

The treated strips were fried in hot oil at 370° F. for 70 seconds at atmospheric pressure. The strips were cooled in refrigerated, circulated air at 0° F. for 6 minutes to a product temperature of 30° F., and then held in refrigerated air at 40° F. for 18 minutes.

The cooled strips were refried under vacuum (15 inches of mercury) in hot oil at 250° F. for 3.0 minutes. The vacuum was maintained in the frying chamber while the strips were introduced into the oil, immersed in the oil, and removed from the oil. The vacuum fried strips then were frozen. The frozen, parfried product had an average solids content of 34.86% by weight, including 7.67 percent oils.

The frozen strips were prepared by frying them in oil at 360° F. for 3 minutes. The strips had a crisp shell and moist interior with flavor typical of baked potatoes. The shell thickness was thinner than standard 3/8 inch cut french fries. The strips did not exhibit toughness upon cooling, yet remained crisp when held for 5 minutes under a heat lamp. The refried strips had an average solids content of 41.64 percent, including 9.68 percent oils.

EXAMPLE 4

This example illustrates the capability of the present invention to use raw potatoes having unusually high raw solids which would not be an acceptable range for conventional french fry processing.

Whole unpeeled Russet Burbank potatoes having an average specific gravities of about 1.10 were washed and sliced into the desired raw cut (1/4 by 1/4 inch cross-section strips). The cut strips were immersion blanched in hot water at 175° F. for 6 minutes. The strips were removed from the blanch water and sprayed with a water solution of 1.0% by weight Sodium Acid Pyrophosphate and 0.5% by weight Dextrose until all strip surfaces are covered by the solution.

The treated strips were fried in hot oil at 360° F. for 60 seconds at atmospheric pressure. The strips were cooled in refrigerated, circulated air at 0° F. for 6 minutes to a product temperature of about 32° F., and held in refrigerated air at 40° F. for 18 minutes.

The cooled strips were refried under vacuum (15 inches of mercury) in hot oil at 250° F. for 3 minutes. The vacuum was maintained in the frying chamber while the strips were introduced into the oil, immersed in the oil, and removed from the oil. The strips then were frozen. The frozen strips had an average solids content of 37.5 percent by weight, well within acceptable limits for this cut style.

The frozen strips were prepared by frying in hot oil at 360° F. for 2.5 minutes. The reconstituted strips had a light, crisp shell and moist interior with the flavor typical of baked potatoes. The strips did not exhibit toughness upon cooling yet remained crisp when held for 7 minutes under a heat lamp.

In all of the above examples, the strips, when reconstituted, demonstrated excellent texture, holding characteristics, and flavor.

EXAMPLE 5

This example illustrates the capability of the invention to produce french fries which may be reconstituted in either a standard radiant-heat oven, a convection oven, or an impingement oven.

Whole unpeeled Russet Burbank potatoes having specific gravities of about 1.08 were washed and sliced into 5/16 by 5/16 inch cross-section strips. The cut strips were then immersion blanched in hot water at 165° F. for 4 minutes. The strips were removed from the blanch water and sprayed with a water solution of 1.0% by weight Sodium Acid Pyrophosphate and 0.5% by weight Dextrose until all strip surfaces were covered by the solution.

The treated strips were fried in hot oil at 360° F. for 70 seconds at atmospheric pressure. The strips were cooled in refrigerated, circulated air at 0° F. for 6 minutes to a product temperature of approximately 32° F. The strips then were held in refrigerated, ambient air at 40° F. for 18 minutes.

The cooled strips were refried under vacuum in hot oil at 270° F. and 15 inches of Hg vacuum for 5 minutes. The vacuum frying chamber was at 15 inches of Hg vacuum before the strips were introduced to the oil, while they were in the oil, and while they were removed from the oil. The strips were removed from the oil and cooled in circulating air for 24 minutes. The cooled strips were fried under vacuum at 270° F. for 6 minutes at 15 inches of Hg. The strips then were frozen. The frozen strips had an average solids content of 71.04%, including 25.52% oils.

Strips produced according to the above example were prepared by three methods: (1) heating in a deep-fat fryer at 360° F. for 30 seconds; (2) heating in a convection oven at 400° F. for 1.5 minutes; (3) heating in an impingement oven for 2 minutes at 350° F.

Those heated in the deep-fat fryer were crisp but not chewy and were ready to eat in 30 seconds. The shell was tender. Those heated in the convection oven had a slightly crisp shell but were not tough, chewy, or limp as is typical of standard french fries when prepared in this manner. Their color was uniform and bright. Those heated in the impingement oven also were crisp but not tough or limp.

EXAMPLE 6

This example demonstrates the capability of the invention to produce french fries which may be reconstituted in either a standard radiant-heat oven, a convection oven, or an impingement oven.

Whole unpeeled Russet Burbank potatoes having specific gravities of about 1.08 were washed and sliced into 0.312 by 0.312 inch cross-section strips. The cut strips were then immersion blanched in hot water at 165° F. for 4 minutes. The strips were then removed from the blanch water and sprayed with a water solution of 1.0% by weight Sodium Acid Pyrophosphate and 0.5% by weight Dextrose until all strip surfaces were covered by the solution.

The treated strips were fried in hot oil at 360° F. for 70 seconds at atmospheric pressure. The strips were then cooled in refrigerated, circulated air at 0° F. for 6 minutes to a product temperature of approximately 32° F. The strips were then held in refrigerated, ambient air at 40° F. for 18 minutes.

The cooled strips were refried only once under vacuum in hot oil at 325° F. and 15 inches of Hg vacuum for 3.0 minutes. The vacuum frying chamber was at 15 inches of Hg vacuum before the strips were introduced to the oil, while they were in the oil, and while they were removed from the oil. The strips were removed from the oil. The strips were then frozen.

The parfried shoestring product had an average solids content of 56.98% with an oil content of 16.10%.

Strips produced according to the above example were reconstituted by three methods: (1) heating in a deep-fat fryer at 360° F. for 30 seconds; (2) heating in a convection oven at 400° F. for 1.5 minutes; (3) heating in an impingement oven for 2 minutes at 350° F.

In deep-fat preparation the strips floated immediately and were ready to eat in 30 seconds. The shell was crisper than that of the lower temperature products made using this method. Those strips reconstituted in the convection oven were very similar to standard deep-fat fried products. The shell was crisp, but not tough. The interior was slightly moist, but not wet. Holding time was excellent. Those reconstituted in 2 minutes in the impingement oven were slightly dry on the surface but not hard or scorched. A retention time of about 1.5 minutes at 320° F. yielded a more tender, crisp shell with baked potato interior.

EXAMPLE 7

This example demonstrates the capability of the invention to produce french fries which may be reconstituted in either a standard radiant-heat oven, a convection oven, or an impingement oven.

Whole unpeeled Russet Burbank potatoes having specific gravities of approximately 1.08 were washed and sliced into 5/16 by 5/16 inch cross-section strips. The cut strips were then immersion blanched in hot water at 165° F. for 4 minutes. The strips were removed from the blanch water and sprayed with a water solution of 1.0% by weight Sodium Acid Pyrophosphate and 0.5% by weight Dextrose until all strip surfaces were covered by the solution.

The strips were fried in hot oil at 360° F. for 70 seconds at atmospheric pressure. The strips were then cooled in refrigerated, circulated air at 0° F. for 6 minutes to a product temperature of approximately 32° F. The strips were then held in refrigerated, ambient air at 40° F. for 18 minutes.

The cooled strips were refried under vacuum in hot oil at 315° F. and 15 inches of Hg vacuum for 5.0 minutes. The vacuum frying chamber was at 15 inches of Hg vacuum before the strips were introduced to the oil, while they were in the oil, and while they were removed from the oil. The strips were removed from the oil and cooled in circulating air for 24 minutes. The strips were fried under vacuum at 260 F. for 1.5 minutes at 15 inches of Hg. The strips were then frozen.

The solids content of the parfried strips were 65.64% with an oil content of 25.16%.

Strips produced according to the above example were reconstituted by three methods: (1) heating in a deep-fat fryer at 360° F. for 30 seconds; (2) heating in a convection oven at 400° for 1.5 minutes; (3) heating in an impingement oven for 2 minutes at 350° F.

Those strips fried in deep fat floated immediately, had a crisp shell and were ready to eat in 30 seconds. Those prepared in the convection oven had a surface shell which was light and crisp with good color and texture. The impingement oven results were similar to those in Example 6 above.

The principles of the present invention also can be applied to convert conventional frozen processed potatoes into quick refry frozen potatoes. In accordance with another embodiment of the present invention, conventional frozen processed potatoes are fried in oil in a vacuum and refrozen.

More specifically, an exemplary conventional product will now be described. In one known process for making frozen processed potatoes, raw potatoes are cleaned, trimmed, inspected, and cut into strips. The cut potato strips are blanched by immersing them in hot water, typically at about 140 to 190° F. for about 3 to 30 minutes, and most preferably at about 160 to 180° F. for about 4 to 14 minutes. The strips are then dipped or sprayed with a solution of dextrose and SAPP as described above. The strips can then be air-dried in a single step or a multi-step sequence, typically for 5 to 15 minutes in air at 100 to 200° F. For example, multiple session air dry steps, where the total amount of air dry time is about 6 to 20 minutes can occur, with 8 to 12 minutes being a possible alternative embodiment. The temperature of these air-dry steps, prior to the first parfry, is in the range of 120 to 260° F., with a possible sub-range of 140 to 200° F. When multiple sessions of air dry steps are used, the temperature can change between the dry sessions, generally increasing with each step. However, a relatively high temperature air dry session, followed by one or more lower temperature sessions, with a final set of sessions returning to the higher temperature, and combinations of such temperature changes, are also contemplated.

The partially dried strips are then parfried in oil, typically at about 355 to 385° F., for about 40 to 80 seconds. In various embodiments, this parfry temperature can range from 25 to 175 seconds, with a subrange of 40 to 75 seconds. The parfry temperature can range from 340 to 390° F., with a subrange of 360 to 375° F. The parfried strips are frozen, typically having a solids content of about 28 to 40%, including about 1 to 8% oils. A flash freezing step is recommended, but not required. The flash freezing step can occur by placing the product in a blast freezer to rapidly achieve a product temperature of about 10° F. A $CO_2$ blast freezer is among the refrigeration means that could be used to achieve this lowering of the product temperature. The frozen strips can be stored at a temperature of 0° F. for as long or as short of a period as is desired, based on the need for final product.

In accordance with this embodiment of the present invention, the frozen strips thereafter are fried in oil in a vacuum, generally following the vacuum, time, and temperature parameters discussed above. Optimally, the strips are vacuum fried in frying oil at a temperature of about 230 to 310° F., preferably about 240 to 290° F., for about 105 to 375 seconds, preferably about 130 to 270 seconds. Again, it is highly preferable to maintain the vacuum at about 10 to 20, preferably about 15, inches of mercury while the strips are introduced into the frying oil, fried in the oil, and removed from the oil.

The vacuum fried strips are then frozen and typically have a solids content of about 36 to 48%, including about 8 to 13% oils. The re-frozen quick-refry product may be reconstituted by finishing frying in oil at about 360° F. for about 80 to 120 seconds, a quicker preparation step than most conventional frozen potato products. The resulting so-called french fries have a solids content of about 40 to 60%, including about 8 to 16% oils. Several specific examples falling within this general embodiment of the present invention are more fully described in the following examples.

EXAMPLE 8

Frozen 5/16 by 5/16 straight cut product were produced from Shepody potatoes blended from one group having an average raw specific gravity of 1.070 and another group having an average raw specific gravity of 1.077. The strips were water blanched for 5 minutes at 166° F. and 5 minutes at 174° F., then treated with 1.0% Dextrose and 0.7% Sodium Acid Pyrophosphate in an immersion flume for 30 seconds. The strips were then air dried for a total of 8 minutes in two successive drying sections of forced air at 120° F. The strips were then fried in soybean oil at 375° F. for 60 seconds and frozen in a blast freezer to a product temperature of about 10° F. At this stage, the strips had a solids content of 34.0% and an oil content of 5.4%. The product was stored prior to further process for 16 days at 0° F.

The frozen strips were fried under 15 inches of vacuum in soybean oil at 250° F. for 3 minutes. The vacuum was maintained while the strips were introduced to the oil, while they were in the oil, and while they were removed from the oil. The fried strips were then frozen in a $CO_2$ blast freezer.

The frozen product was reconstituted in a deep-fat fryer using soybean oil at 360° F. The strips were fried in two tests for 80 and 90 seconds, respectively. The final color shade in each was 0.5 on the Munsell color chart which is a target color of most premium grade french fries. At 80 seconds the shell was tender and crisp and the interior was typical of french fries that are normally refried for 2.5 to 3 minutes at 360° F. At 90 seconds, the shell was thicker and the edges more pronounced, so consumers were judged to likely prefer the product made using the 80 second preparation method. The flavor of the product was similar to conventionally prepared french fries. The par-fried frozen product has a solids content of about 42% and an oil content of about 12%. The finish fried product had a solids content of 50.6% and an oil content of 13.9% by weight.

EXAMPLE 9

Frozen 3/8 by 3/8 straight cut strips were produced from Shepody potatoes with an average raw specific gravity of 1.087. The strips were water blanched for 11 minutes at 167° F., then treated with 2.0% Dextrose and 0.73% Sodium Acid Pyrophosphate in an immersion flume for 30 seconds. The strips were then air dried for 7 minutes in 5 successive drying sections of forced air, with two sessions being at 150° F. and the following three sessions being performed at 160° F. The strips were fried in tallow at 385° F. for 50 seconds and frozen in a blast freezer to a product temperature of about 10° F., then stored prior to reprocessing in a 0° F. storage for 14 days. At this stage, the strips have had a solids content of 31.7% and an oil content of 3.4% by weight.

The frozen strips were fried under 15 inches of vacuum in soybean oil at 250° F. for 4 minutes. The vacuum was maintained while the strips were introduced to the oil, while they were in the oil, and while they were removed from the oil. The fried strips were then frozen in a $CO_2$ blast freezer.

The frozen product was reconstituted in a deep-fat fryer using soybean oil at 360° F. for 90 seconds. The final color shade was a 0.5 on the Munsell color chart, a target for premium grade french fries. The shell was slightly crisp and tender. The interior was typical of french fries that are normally refried for 3 to 3.5 minutes at 360° F. Flavor was clean and similar to conventionally processed french fried potatoes.

The par-fried frozen product had a solids content of 39.9% and an oil content of 8.5% by weight. The finish fried product had a solids content of 49% and an oil content of 11% by weight.

EXAMPLE 10

Frozen ½ by ½ crinkle cut strips were produced from Shepody potatoes with an average raw specific gravity of 1.081. The strips were water blanched for 11 minutes at 167° F., then treated with 1.0% Dextrose and 0.7% Sodium Acid Pyrophosphate in an immersion flume for 30 seconds. The strips were then air dried for 7 minutes in 5 successive drying sessions with two at 150° F. and three at 160° F. The strips were fried in tallow at 385° F. for 50 seconds and frozen in a blast freezer to a product temperature of about 10° F., then stored prior to reprocessing in 0° F. storage for 13 days. At this stage, the strips had a solids content of 30.9% and an oil content of 5.1% by weight.

The frozen strips were fried under 15 inches of vacuum in soybean oil at 250° F. for 4 minutes. The vacuum was maintained while the strips were introduced to the oil, while they were in the oil, and while they were removed from the oil. The fried strips were then frozen in a $CO_2$ blast freezer.

The frozen product was reconstituted in a deep-fat fryer using soybean oil at 360° F. for 90 seconds. The final color shade was a 0.5 on the Munsell color chart, a target for premium grade french fries. The shell was crisp. Outside pieces and slivers were more crisp but acceptable. The 90 second reconstitution resulted in an internal texture that was typical of french fries that are normally refried for 2.5 to 3.5 minutes at 360° F. Flavor was clean and similar to conventionally processed french fried potatoes.

The par-fried frozen product had a solids content of 38.3% and an oil content of 8.7% by weight. The finish fried product had a solids content of 42.2% and an oil content of 10.3% by weight.

EXAMPLE 11

Frozen large wedges retaining the potato skin on the outer surface were produced from Shepody potatoes with an average raw specific gravity of 1.080. The strips were water blanched for 11 minutes at 172° F., then treated with 1.0% Dextrose and 0.7% Sodium Acid Pyrophosphate in an immersion flume for 30 seconds. The strips were then air dried for 10 minutes in 2 successive drying sections of forced air at 150° F. The strips were fried in soybean oil at 375° F. for 65 seconds and frozen in a blast freezer to a product temperature of about 10° F., then stored prior to reprocessing in a 0° F. storage for 91 days. At this stage, the strips have a solids content of 29.5% and an oil content of 2.4% by weight.

The frozen strips were fried under 15 inches of vacuum in soybean oil at 260° F. for 4 minutes. The vacuum was maintained while the strips were introduced to the oil, while they were in the oil, and while they were removed from the oil. The fried strips were then frozen in a $CO_2$ blast freezer.

The frozen product was reconstituted in a deep-fat fryer using soybean oil at 360° F. for 110 seconds. The final color shade was a 1.5 on the Munsell color chart, a target for premium grade skin-on french fries. The shell was slightly crisp. Outside pieces and slivers were more crisp. The 90 second reconstitution resulted in an internal texture that was typical of wedges that are normally refried for 3.5 to 4 minutes at 360° F. Flavor was clean and similar to conventionally processed skin-on wedge potatoes.

The par-fried frozen product had a solids content of 37% and an oil content of 8.4% by weight. The finish fried product had a solids content of 42.3% and an oil content of 11.8% by weight.

EXAMPLE 12

Frozen ⅜ by ¾ steak cut strips were produced from Shepody potatoes with an average raw specific gravity of 1.085. The strips were water blanched for 16 minutes at 174° F., then treated with 1.8% Dextrose and 0.91% Sodium Acid Pyrophosphate in an immersion flume for 30 seconds. The strips were then air dried for 7 minutes in 5 successive drying sections of forced air, with two sessions at 150° F. and the next three successive sessions at 170° F. The strips were fried in soybean oil at 385° F. for 60 seconds and frozen in a blast freezer to a product temperature of about 10° F., then stored prior to reprocessing in a 0° F. storage for 11 days. At this stage, the strips have had a solids content of 29.0% and an oil content of 3.9% by weight.

The frozen strips were fried under 15 inches of vacuum in soybean oil at 260° F. for 4 minutes. The vacuum was maintained while the strips were introduced to the oil, while they were in the oil, and while they were removed from the oil. The fried strips were then frozen in a $CO_2$ blast freezer.

The frozen product was reconstituted in two tests in a deep-fat fryer using soybean oil at 360° F. for 100 and 120 seconds, respectively. The final color shade was a 1.25 to 1.5 on the Munsell color chart, a target for premium grade steak fries. The shell was slightly crisp, but not thick. Center cuts were slightly translucent, but fully cooked. Outside pieces and slivers were more crisp. The 120 second reconstitution resulted in an internal texture that was typical of wedges that are normally refried for 3.5 to 4 minutes at 360° F., with a clean flavor similar to conventionally processed steak fries.

The par-fried product had a solids content of 37% and an oil content of 8.4% by weight. The refried product had a solids content of 42.7% and an oil content of 8.8% by weight.

EXAMPLE 13

Frozen ¼ by ¼ shoestring cut strips were cut into a product having 34.1% solids, from Ranger potatoes with an average raw specific gravity of 1.085. The strips were water blanched for 5 minutes at 163° F., then treated with 1.0% Dextrose and 0.7% Sodium Acid Pyrophosphate in an immersion flume for 30 seconds. The strips were then air dried for 10 minutes in 6 successive drying sections of forced air, with two sessions at 118° F., and two alternating sessions at 109° F. and 113° F. The strips were fried in soybean oil at 375° F. for 47 seconds and frozen in a blast freezer to a product temperature of about 10° F., then reprocessed immediately. At this stage, the strips have had a solids content of 36.0% and an oil content of 5.5% by weight.

The frozen strips were fried under 15 inches of vacuum in soybean oil at 250° F. for 2 minutes and 20 seconds. The vacuum was maintained while the strips were introduced to the oil, while they were in the oil, and while they were removed from the oil. The fried strips were then frozen in a $CO_2$ blast freezer.

The frozen product was reconstituted in two tests in a deep-fat fryer using soybean oil at 360° F. for 80 and 90 seconds, respectively. The final color shade was a 1.25 to 1.5 on the Munsell color chart, a target for premium grade shoestring fries. The shell was slightly crisp, but tender. Little or no blistering of outside pieces and slivers was noticed. The 90 second reconstitution resulted in an internal texture that was typical of wedges that are normally refried for 3.1 minutes at 310° F., with a clean flavor similar to conventionally processed shoestring fries.

The par-fried frozen product had a solids content of 45.3% and an oil content of 11.8% by weight. The finish fried product had a solids content of 57.7% and an oil content of 14.7% by weight.

Having illustrated and described the principles of our invention with reference to several preferred embodiments, it should be apparent to those of ordinary skill in the art that the invention may be modified in arrangement and detail without departing from such principles.

For example, while the present invention is particularly well-suited for preparing "quick refry" frozen potato products capable of being quickly reconstituted by finish frying in hot oil for about 80 to 90 seconds, it also may be used to produce products capable of even faster reconstitution as well as more traditional products requiring longer reconstitution times. While the present invention may be used to prepare frozen potato products optimally reconstituted by finish frying, it also may be used to produce products reconstitutable by other methods such as oven heating. The present invention also is believed to have application to other vegetables having characteristics similar to potatoes (such as sweet potatoes, carrots, other root vegetables, apples, apricots and the like). The present invention is well-suited for preparing high solids potato products (normally subjected to relatively extensive processing), but also can be used advantageously to produce potato products having solids contents in the low and mid ranges.

Accordingly, we claim as our invention all such modifications as come within the true spirit and scope of the following claims:

We claim:

1. A method of preparing potato strips comprising:
   blanching the strips;
   parfrying the strips a first time in oil at atmospheric pressure;
   freezing the once parfried strips;
   parfrying the strips a second time in oil in a vacuum of about 10 to 20 inches of mercury, the frying oil having a temperature of about 240 to 290° F., the vacuum being maintained while the strips are introduced into the oil, immersed in the oil, and removed from the oil; and
   freezing the twice parfried strips.

2. The method of claim 1 wherein the strips are blanched by immersing the strips in hot water at a temperature of about 140 to 190° F. for about 3 to 30 minutes.

3. The method of claim 2 wherein the strips are blanched in hot water at a temperature of about 160 to 180° F. for about 4 to 14 minutes.

4. The method of claim 1 wherein the strips are parfried at atmospheric pressure at a temperature of about 340 to 390° F. for about 25 to 170 seconds.

5. The method of claim 4 wherein the strips are parfried at atmospheric pressure at a temperature of about 360 to 375° F. for about 40 to 75 seconds.

6. The method of claim 1 wherein the strips are parfried in a vacuum at a temperature of about 230 to 310° F. for about 105 to 375 seconds.

7. The method of claim 6 wherein the strips are parfried in a vacuum at a temperature of about 240 to 290° F. for about 130 to 270 seconds.

8. The method of claim 7 wherein the strips are partially fried in a vacuum of about 15 inches of mercury.

9. The method of claim 1 wherein the strips are parfried the first time in oil at a temperature of about 360 to 375° F. for about 40 to 75 seconds, and parfried the second time in oil at a temperature of about 240 to 290° F. for about 130 to 270 seconds.

10. The method of claim 9 wherein the vacuum is maintained at about 15 inches of mercury during parfrying the second time.

11. A method of preparing potato strips comprising:
    blanching the strips;
    air drying the blanched strips;
    parfrying the strips a first time in oil at atmospheric pressure;
    freezing the once parfried strips;
    parfrying the strips a second time in oil in a vacuum, the vacuum being maintained while the strips are introduced into the oil, immersed in the oil, and removed from the oil; and
    freezing the twice parfried strips.

12. The method of claim 11 wherein the strips are air dried for about 6 to 20 minutes at about 120 to 260° F.

13. The method of claim 12 wherein the strips are air dried for about 8 to 12 minutes at about 140 to 200° F.

14. The method of claim 11 wherein the strips are parfried the first and second times for sufficient durations and at temperatures sufficient to give the frozen strips a solids content by weight of about 36–50%.

15. The method of claim 11 wherein the strips are parfried the second time in a vacuum of about 10 to 20 inches of mercury, at a temperature of about 240 to 290° F. for about 130 to 270 seconds.

16. The method of claim 11 wherein the twice parfried strips are frozen and parfried a third time in oil in a vacuum prior to the final freeze step.

17. A method of preparing potato strips comprising:
    blanching the strips;
    after blanching, parfrying the strips in oil at atmospheric pressure;
    after blanching, parfrying the strips in oil in a vacuum;
    freezing the strips a first time between the vacuum parfrying and atmospheric parfrying steps; and
    then freezing a second time the twice parfried strips.

18. The method of claim 17, wherein the vacuum parfrying step is subsequent to the atmospheric parfrying step.

19. A method of preparing potato strips comprising:
    blanching the strips;
    parfrying the strips a first time in oil at atmospheric pressure;
    freezing the once parfried strips;
    parfrying the strips a second time in oil in a vacuum of about 10 to 20 inches of mercury, the frying oil having a temperature of about 240 to 290° F., the vacuum being maintained while the strips are initially exposed to the oil, fried in the oil, and removed from the oil; and freezing the twice parfried strips.

20. The method of claim 19 wherein the strips are blanched by immersing the strips in hot water at a temperature of about 160 to 180° F. for about 4 to 9 minutes.

21. The method of claim 19 wherein the strips are parfried in a vacuum at a temperature of about 240 to 260° F. for about 1 to 5 minutes.

22. The method of claim 19 wherein the strips are parfried the first time in oil at a temperature of about 350 to 380° F. for about 20 to 100 seconds, and parfried the second time in oil at a temperature of about 240 to 260° F. for about 2 to 4 minutes.

23. A method of preparing root vegetable strips comprising:

blanching the strips;

parfrying the strips a first time in oil at atmospheric pressure;

cooling the once parfried strips;

parfrying the cooled strips a second time in oil in a vacuum; and freezing the twice parfried strips;

wherein the strips are parfried the first and second times for sufficient durations and at temperatures sufficient to give the frozen strips a solids content by weight of about 36–50%.

24. The method of claim 23 wherein the strips are parfried the second time in a vacuum of about 10 to 20 inches of mercury, at a temperature of about 240 to 260° F. for about 1 to 5 minutes.

25. The method of claim 23 wherein the twice parfried strips are cooled and parfried a third time in oil in a vacuum prior to freezing.

26. A method of preparing root vegetable strips comprising:

blanching the strips;

after blanching, parfrying the strips in oil at atmospheric pressure;

freezing the parfried strips;

parfrying the frozen strips in oil in a vacuum, the vacuum being maintained while the strips are initially exposed to the oil, in contact with the oil and removed from the oil; and freezing the twice parfried strips.

27. The method of claim 26 wherein the root vegetable strips are potato strips.

* * * * *